US010841753B2

(12) United States Patent
Sedlacek et al.

(10) Patent No.: US 10,841,753 B2
(45) Date of Patent: *Nov. 17, 2020

(54) PROTECTION OF MISSION-CRITICAL PUSH-TO-TALK MULTIMEDIA BROADCAST AND MULTICAST SERVICE SUBCHANNEL CONTROL MESSAGES

(71) Applicant: TELEFONAKTIEBOLAGET LM ERICSSON (PUBL), Stockholm (SE)

(72) Inventors: Ivo Sedlacek, Hovorcovice (CZ); Jörgen Axell, Danderyd (SE); Noamen Ben Henda, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/439,125

(22) Filed: Jun. 12, 2019

(65) Prior Publication Data
US 2019/0297469 A1 Sep. 26, 2019

Related U.S. Application Data
(60) Continuation of application No. 16/123,320, filed on Sep. 6, 2018, now Pat. No. 10,356,566, which is a (Continued)

(51) Int. Cl.
H04W 4/10 (2009.01)
H04L 29/06 (2006.01)
(Continued)

(52) U.S. Cl.
CPC .......... H04W 4/10 (2013.01); H04L 63/0428 (2013.01); H04L 63/0876 (2013.01);
(Continued)

(58) Field of Classification Search
CPC ....... H04W 4/10; H04W 12/02; H04W 12/10; H04W 12/06; H04W 72/0453; H04L 63/0428; H04L 63/0876
See application file for complete search history.

(56) References Cited

U.S. PATENT DOCUMENTS
2016/0302048 A1  10/2016  Suzuki et al.
2017/0070868 A1*  3/2017  Allen .................. H04W 4/10
2018/0041353 A1  2/2018  Lefebre et al.

FOREIGN PATENT DOCUMENTS
WO    WO-2015144196 A1 * 10/2015  ............. H04L 63/04

OTHER PUBLICATIONS
3GPP-1 TS 24.379 V13.2.0-24379-d20 (Year: 2016).*
(Continued)

Primary Examiner — Dong-Chang Shiue

(57) ABSTRACT
A Mission-Critical Push-To-Talk (MCPTT) node is connected to a group of user equipments (UEs) served by the MCPTT node. The MCPTT node generates a Multimedia Broadcast and Multicast Service (MBMS) Subchannel Control Key (MSCCK), sends first messages to the UEs in unicast, wherein the first messages include the generated MSCCK, generates at least one MBMS subchannel control message, applies integrity protection and/or confidentiality protection to the at least one MBMS subchannel control message with the MSCCK, and sends the at least one MBMS subchannel control message in multicast.

10 Claims, 14 Drawing Sheets

Related U.S. Application Data division of application No. 15/591,934, filed on May 10, 2017, now Pat. No. 10,225,699.

(60) Provisional application No. 62/414,890, filed on Oct. 31, 2016.

(51) Int. Cl.
    *H04W 12/00* (2009.01)
    *H04W 12/10* (2009.01)
    *H04W 72/04* (2009.01)

(52) U.S. Cl.
    CPC ... *H04W 12/0017* (2019.01); *H04W 12/1006* (2019.01); *H04W 72/0453* (2013.01)

(56) References Cited

OTHER PUBLICATIONS

3GPP-2 TS 24.380 MCPTT media plane control—ts_124380v130101p (Year: 2016).*

"3rd Generation Partnership Project; Technical Specification Group Services and System Aspects; Functional architecture and information flows to support mission critical communication services; Stage 2(Release 13)", 3GPP TS 23.179, vol. SA WG6, v13.3.0, Sep. 26, 2016.

Ericsson, "Media plane security", 3GPP DRAFT; C1-164115-V19, vol. CTWG1, Oct. 16, 2016.

Ericsson, "LS on protection of RTCP transported media control messages, RTCP APP transported pre-established session control messages and MBMS subchannel control messages", 3GPPTSG CT WG 1 Meeting 100, TDoc C1-164680, Oct. 16, 2016.

"3rd Generation Partnership Project; Technical Specification Group Core Networks and Terminals; Mission Critical Push to Talk (MCPTT) call control; Protocol specification (Release 13)", 3GPP TS 24.379, vol. 13.2.0, Sep. 2016.

"3rd Generation Partnership Project; Technical Specification Group Services and System Aspects; Security of Mission Critical Push to Talk (MCPTT) over LTE; (Release 13)", 3GPP TS 33.179, vol. 13.2.0, Sep. 2016.

"3rd Generation Partnership Project; Technical Specification Group Core Networks and Terminals; Mission Critical Push to Talk (MCPTT) call control; Protocol specification (Release 13)", 3GPP TS 24.379, vol. 13.1.0, Jun. 2016.

"3rd Generation Partnership Project; Technical Specification Group Core Network and Terminals Mission Critical Push to Talk (MCPTT) media plane control; Protocol specification (Release 14)", 3GPP TS 24.380, vol. 14.0.0, Sep. 2016.

* cited by examiner

PROTECTION OF MISSION-CRITICAL PUSH-TO-TALK MULTIMEDIA BROADCAST AND MULTICAST SERVICE SUBCHANNEL CONTROL MESSAGES

CROSS-REFERENCE TO RELATED APPLICATIONS

This application is continuation of U.S. patent application Ser. No. 16/123,320 filed on Sep. 6, 2018, which is divisional of U.S. patent application Ser. No. 15/591,934 filed on May 10, 2017, now granted as U.S. Pat. No. 10,225,699 on Mar. 5, 2019, which claims the priority to U.S. Provisional Patent Application No. 62/414,890 filed on Oct. 31, 2016, the subject matter of which are hereby incorporated by references.

TECHNICAL FIELD

The disclosed subject matter relates generally to telecommunications. Certain embodiments relate more particularly to Mission-Critical Push-To-Talk (MCPTT).

BACKGROUND

MCPTT is a 3GPP-related technology that provides half-duplex communication between users of a MCPTT group. MCPTT is intended to provide secure and reliable communication for government and private actors such as police, fire fighters, and ambulance personnel for whom the availability of communication is Mission-Critical.

MCPTT enables multicast distribution of media and floor control messages to User Equipments (UEs) using a Multimedia Broadcast and Multicast Service (MBMS) bearer. It also enables direct unicast communication to each individual UE.

FIG. 1 is a block diagram illustrating an example context in which multicast distribution may occur. More specifically, FIG. 1 illustrates an MCPTT on-network architecture 100 implementing MBMS as presented in FIG. 5.2.7-1 of 3GPP TS 23.179 V13.5.0.

Referring to FIG. 1, MCPTT on-network architecture 100 comprises an MCPTT client located in a UE 105, an MCPTT server 110 shown bundled with a Group Communication Service Application Server (GCS AS), and an Evolved Universal Mobile Telecommunications System (UMTS) Terrestrial Radio Access Network (E-UTRAN) 115 located between UE 105 and MCPTT server 110. E-UTRAN 115 provides communication between UE 105 and MCPTT server 110 via a unicast path 120 and an MBMS path 125. In general, communication may be conducted between the various features of architecture 100 via interfaces as illustrated in FIG. 1 and described in 3GPP TS 23.179.

FIG. 2A is a signal diagram illustrating a conventional method 200A for performing multicast distribution, and FIG. 2B is a flowchart illustrating method 200B, which is a simplified version of the method 200A. These methods could be performed e.g. in a context such as that illustrated in FIG. 1.

Referring to apparatus features in FIG. 2A, three UEs 205A-C comprise MCPTT clients, and they communicate with an MCPTT server 210 through unicast connections prior to activation of an MBMS bearer. Once the MBMS bearer is activated, the UEs receive multicast messages from MCPTT server 210.

MCPTT server 210 may transport media and floor control messages of several sessions via one MBMS bearer, and different UEs can participate in one or more of those sessions. For instance, in the example of FIG. 2, MCPTT server 210 uses a single MBMS bearer to transport media and floor control messages for a session X for an MCPTT group G1. MCPTT server 210 uses unicast bearers to transport media and floor control messages for a session Y for an MCPTT group G2, and for a session Z for MCPTT group G3. UE 205A participates in session X, UE 205B participates in session Y and UE 205C participates in session X and Z.

Referring to signaling features in FIG. 2A, in steps 0a, 0b, 0c and 0d, media and floor control messages of sessions X, Y and Z are distributed between UEs 205A-C and MCPTT server 210. As indicated above, UE 205A participates in session X for MCPTT group G1, UE B participates in session Y for MCPTT group G2 and UE C participates in session X for MCPTT group G1 and Z for MCPTT group G3.

In step 1, MCPTT server 210 activates an MBMS bearer. Thereafter, in steps 2a, 2b and 2c, MCPTT server 210 announces the MBMS bearer, using unicast Session Initiation Protocol (SIP) signaling, to the UEs using a SIP message request sent in accord with 3GPP TS 24.379 subclause 14.2.2.2. The SIP signaling includes media parameters and internet protocol (IP) address and port for the MBMS general purpose MBMS subchannel, media parameters for transport of media and floor control messages (excluding destination multicast IP addresses and ports) via MBMS bearer, and Temporary Mobile Group Identity (TMGI).

In steps 3a, 3b, 3c, when each UE detects that the MBMS bearer identified by the TMGI is available, each UE informs the MCPTT server 210, using unicast SIP signaling, about the availability of the MBMS bearer in the location of the UE by sending a SIP message request containing an MBMS bearer listening status set to "listening" in accord with 3GPP TS 24.379 subclause 14.3.3.2. Then, the UE starts receiving messages on the MBMS general purpose MBMS subchannel of the MBMS bearer.

In step 4, MCPTT server 210 decides to send media of session X via the activated MBMS bearer. Thereafter, in step 5, MCPTT server 210 sends a Map Group To Bearer message via MBMS bearer and indicates that session of MCPTT Group G1 will be sent via MBMS bearer using particular MBMS subchannels with indicated IP addresses and indicated ports for media and floor control messages.

In steps 6a and 6c, based on reception of the "Map Group To Bearer" message, UEs 205A and 205C start listening for media and floor control messages received via the MBMS bearer on the IP addresses and ports as indicated in the Map Group To Bearer message. UE 205B receives the "Map Group To Bearer" message too, but because it relates to MCPTT Group G1 where UE 205B does not participate, UE 205B ignores the Map Group To Bearer message.

In steps 7a-e, media and floor control messages of session X are distributed between UE 205A, UE 205C and MCPTT server 210. In uplink, the media and floor control messages still use unicast. In downlink, the media and floor control messages interesting to both UE A and UE C are sent via MBMS bearer on the IP addresses and ports as indicated in the Map Group To Bearer message in step 6a, 6c. In downlink, the floor control messages interesting to UE A only and UE C only are sent via unicast.

In steps 7x and 7y, media and floor control messages of sessions Y and Z are distributed between UE 205B, UE 205C and MCPTT server 210. They are unchanged (i.e. they still use unicast transport) as MCPTT Group G2 and MCPTT Group G3 were not indicated in the "Map Group To Bearer" message in steps 6a and 6c.

Referring to FIG. 2B, method 200B comprises steps S205-S230, which are simplified or distilled versions of the steps in method 200A. In step S205, MCPTT server 210 activates an MBMS bearer. Thereafter, in step S210, MCPTT server 210 announces the MBMS bearer, using unicast Session Initiation Protocol (SIP) signaling, to UEs 205A-C using a SIP MESSAGE request sent in accord with 3GPP TS 24.379 subclause 14.2.2.2.

In step S215, each UE informs the MCPTT server, using unicast SIP signaling, about availability of the MBMS bearer in location of the UE. It does so by sending a SIP message request containing MBMS bearer listening status in accord with 3GPP TS 24.379 subclause 14.3.3.2.

In step S220, when a sufficient number of UEs report availability of the MBMS bearer at a given location, MCPTT server sends a "Map Group To Bearer" message via the MBMS bearer (steps 4 & 5 of FIG. 2A), starts sending media and (some types of) floor control messages using MBMS bearer (i.e. using multicast), and stops sending media and (some types of) floor control messages using unicast to the UEs which informed the MCPTT server about availability of the MBMS bearer. When a UE receives this message, the UE starts receiving and rendering the media and floor control messages via the MBMS bearer (i.e. using multicast).

In step S225, as each UE moves, it may move to a location where the MBMS bearer is no longer available. In such case, the UE informs the MCPTT server, using unicast SIP signaling, about non-availability of the MBMS bearer in location of the UE.

In step S230, when the amount of UEs reporting availability of the MBMS bearer at a given location gets low, MCPTT server sends an "Unmap Group To Bearer" message via the MBMS bearer, stops sending media and (some types of) floor control messages using MBMS bearer (i.e. using multicast), and starts sending media and floor control messages using unicast to all the UEs. The UEs starts receiving the media and floor control messages using unicast.

In the methods illustrated in FIGS. 2A and 2B, the "Map Group To Bearer" message and "Unmap Group To Bearer" message each contain MCPTT Group identifier (ID), which is supposed to not be disclosed to other unauthorized UEs in accord with TS 33.179. These constraints are described in further detail in 3GPP TS 24.379 subclause 14 and 3GPP TS 24.380 subclause 4.1.3.

SUMMARY

In some embodiments of the disclosed subject matter, a UE comprises an MCPTT client equipped to be connected to a MCPTT node that serves the UE. The UE comprises processing circuitry, memory, and transceiver circuitry collectively configured to receive a first message from the MCPTT node in unicast when activating an MBMS bearer, wherein the first message comprises an MBMS Subchannel Control Key (MSCCK), identify the MSCCK from the message, receive an MBMS subchannel control message from the MCPTT node, and apply integrity protection and/or confidentiality protection to the MBMS subchannel control message using the MSCCK.

In certain related embodiments, decrypting and/or integrity checking the MBMS subchannel control message using the MSCCK comprises generating a message authentication code (MAC) value using the at least one MBMS subchannel control message and the MSCCK, and comparing the generated MAC value to a MAC value appended to the at least one MBMS subchannel control message.

In certain related embodiments, decrypting and/or integrity checking the MBMS subchannel control message using the MSCCK comprises decrypting the MBMS subchannel control message using the MSCCK.

In certain related embodiments, the at least one MBMS subchannel control message comprises a Map Group To Bearer message.

In certain related embodiments, the at least one MBMS subchannel control message comprises an Unmap Group To Bearer message.

In some embodiments of the disclosed subject matter, a method is provided for operating a user equipment (UE) comprising a Mission-Critical Push-To-Talk (MCPTT) node equipped to be connected to a MCPTT node that serves the UE. The method comprises receiving a first message from the MCPTT node in unicast when activating a Multimedia Broadcast and Multicast Service (MBMS) bearer, wherein the first message comprises a MBMS Subchannel Control Key (MSCCK), identifying the MSCCK from the message, receiving an MBMS subchannel control message from the MCPTT node, and applying integrity protection and/or confidentiality protection to the MBMS subchannel control message using the MSCCK.

In certain related embodiments, decrypting and/or integrity checking the MBMS subchannel control message using the MSCCK comprises generating a message authentication code (MAC) value using the at least one MBMS subchannel control message and the MSCCK, and comparing the generated MAC value to a MAC value appended to the at least one MBMS subchannel control message.

In certain related embodiments, decrypting and/or integrity checking the MBMS subchannel control message using the MSCCK comprises decrypting the MBMS subchannel control message using the MSCCK.

In certain related embodiments, the at least one MBMS subchannel control message comprises a Map Group To Bearer message.

In certain related embodiments, the at least one MBMS subchannel control message comprises an Unmap Group To Bearer message.

BRIEF DESCRIPTION OF THE DRAWINGS

The drawings illustrate selected embodiments of the disclosed subject matter. In the drawings, like reference labels denote like features.

FIGS. 2A-1 and 2A-2 show a signal diagram illustrating a conventional method of performing multicast distribution.

DETAILED DESCRIPTION

Figure 1:
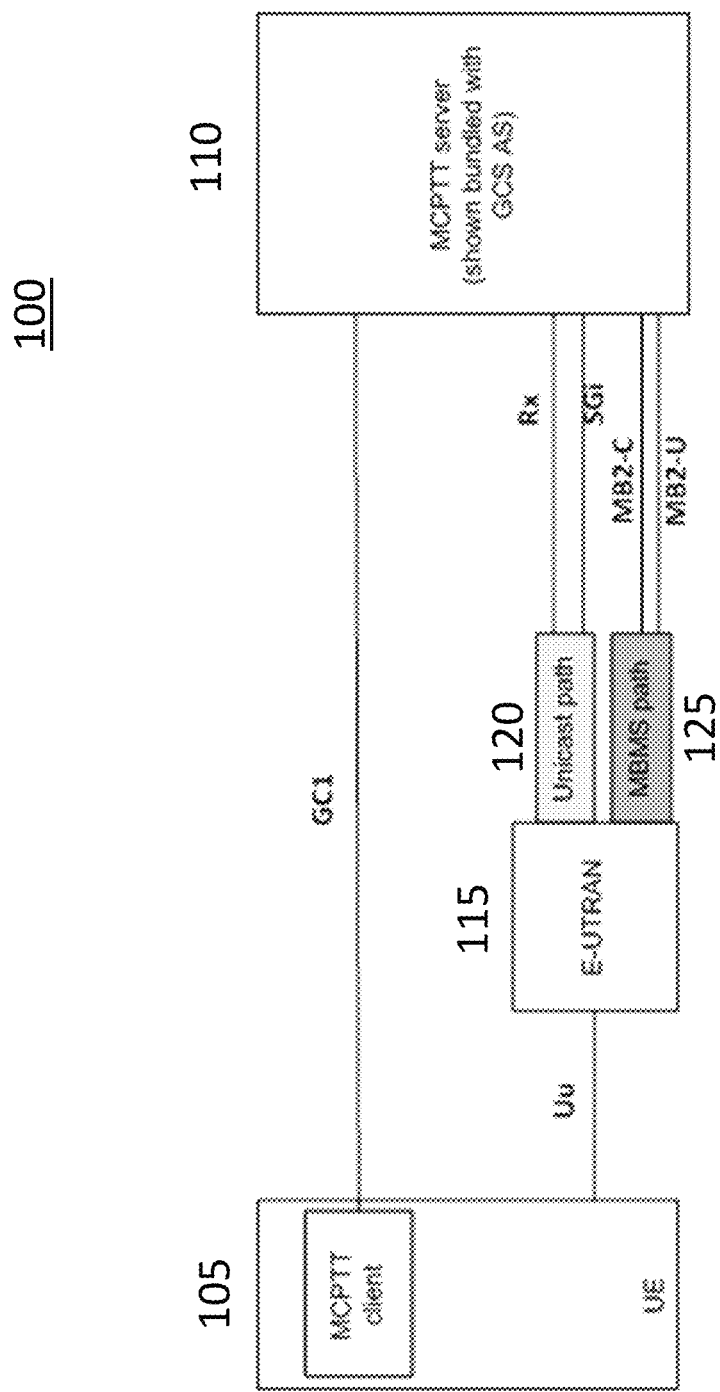
FIG. 1 is a block diagram illustrating an example context in which multicast distribution may occur.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

Certain embodiments are presented in recognition of shortcomings associated with conventional techniques and technologies, such as the following examples.

In conventional systems, the (1) "Unmap Group To Bearer" message and (2) "Map Group To Bearer" message (and possibly other MBMS subchannel control messages e.g. as specified in 3GPP TS 24.380 subclause 8.4) are not protected.

Protection of such messages is desirable for the following reasons. First, at least two types of the currently specified messages (e.g. 1 and 2) include MCPTT Group IDs which are classified as sensitive data and to which confidentiality protection may be applied. Therefore, confidentiality protection is needed.

Second, an attacker replaying or even constructing fake messages can disrupt a call by telling MCPTT UEs to start receiving and rendering the media and floor control messages via the MBMS bearer while no media and/or no floor control messages are sent. This is a denial of service attack. Therefore, integrity protection is needed as well. However, 3GPP TS 33.179 does not specify protection for this purpose, which is the protection of MBMS subchannel control messages.

3GPP TS 33.179 defines two keys for the protection of group call sessions. These keys are the Group Management Key (GMK) and the multicast key floor control (MKFC). The GMK is used for the protection of the media and the MKFC is used for the protection of the multicast floor control from the MCPTT server to the MCPTT UE. Similarly, other keys not related to group calls are dedicated to other purposes. For example, the Private Call Key (PCK) is used to protect private calls, the Call Service Key (CSK) is used to protect signaling between MCPTT UE and MCPTT domains, etc.

Because MBMS subchannel control messages are distributed over MBMS bearers, they cannot be protected by MCPTT UE-specific keys such as the PCK or the CSK. Consequently, they require a different solution.

Certain embodiments provide potential benefits compared to conventional techniques and technologies, such as the following examples. In certain embodiments, the "Unmap Group To Bearer" message and "Map Group To Bearer" message as well as other MBMS subchannel control messages (e.g. as specified in 3GPP TS 24.380 subclause 8.4), are integrity and confidentiality protected and thus cannot be spoofed. This provides a MCPTT system that has a higher threshold for denial of service attacks.

In certain embodiments described below, protection is provided for the "Unmap Group To Bearer" message, "Map Group To Bearer" message, and other MBMS subchannel control messages (e.g. as specified in 3GPP TS 24.380 subclause 8.4).

Figure 3A:
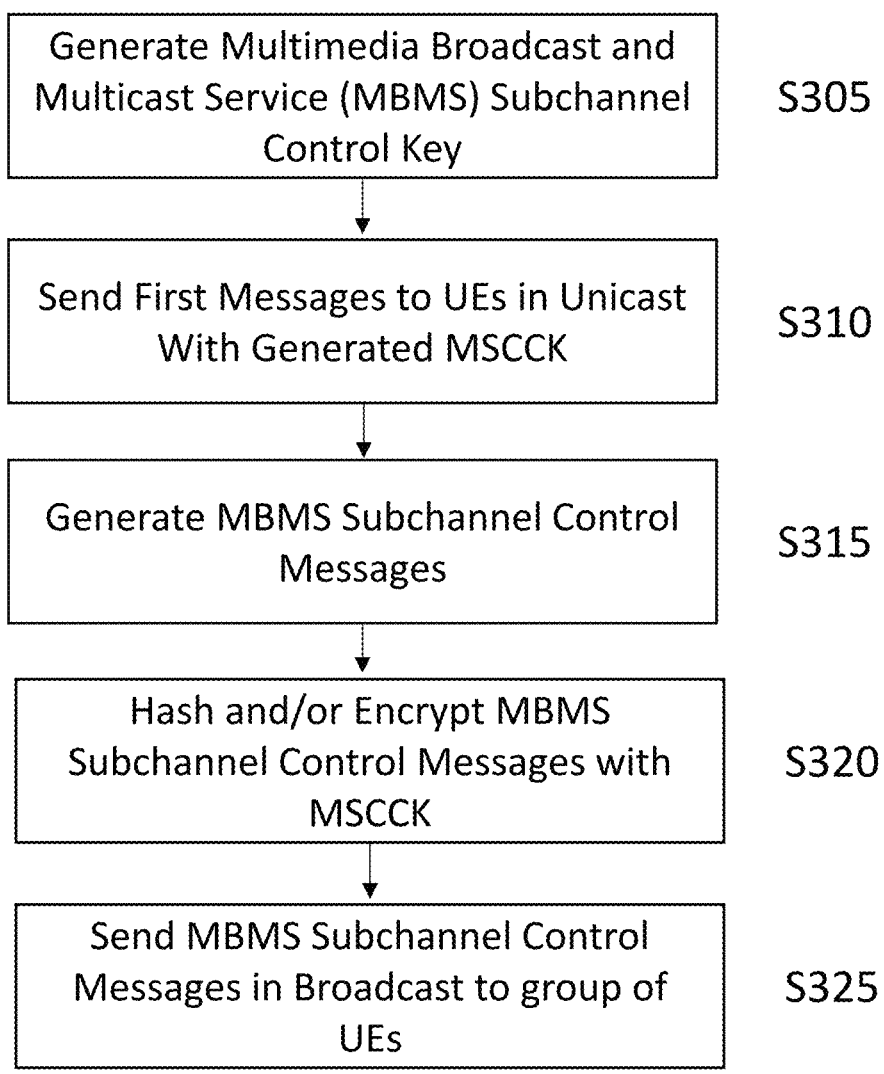
FIG. 3A is a flowchart illustrating a method of operating an MCPTT node (e.g., an MCPTT server) according to an embodiment of the disclosed subject matter.
Figure 3B:
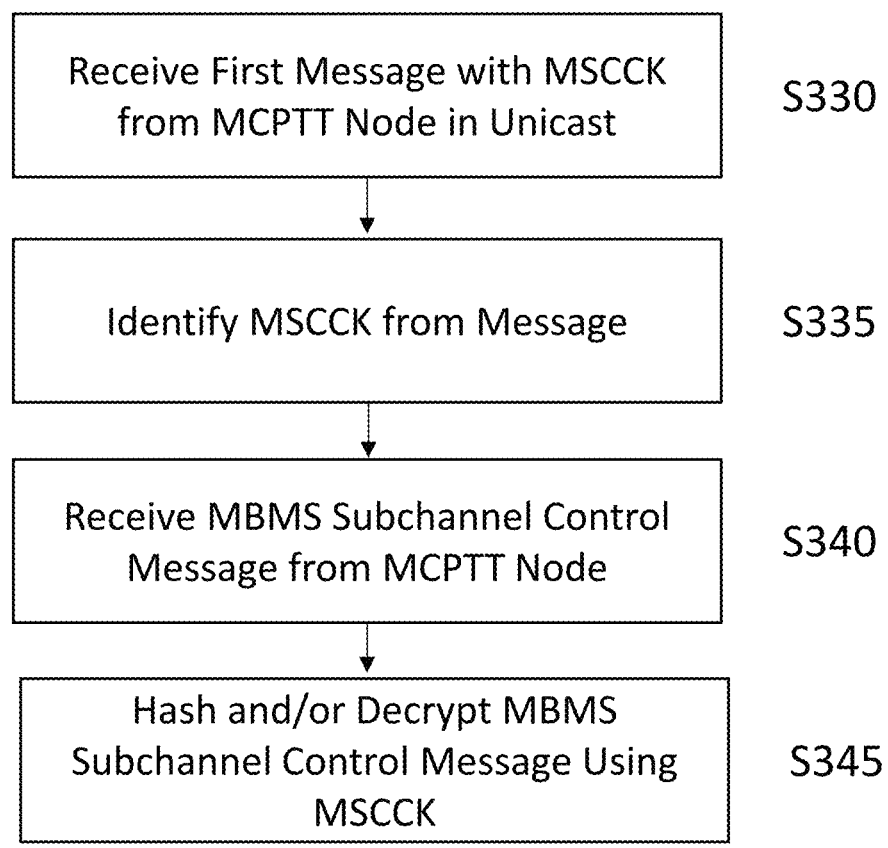
FIG. 3B is a flowchart illustrating a method of operating a UE according to an embodiment of the disclosed subject matter.

FIG. 3A is a flowchart illustrating a method 300A of operating an MCPTT node according to an embodiment of the disclosed subject matter, and FIG. 3B is a flowchart illustrating a method 300B of operating a UE according to an embodiment of the disclosed subject matter. In some contexts, the methods of FIGS. 3A and 3B may be performed in coordinated fashion. For instance, an MCPTT node may perform certain parts of method 300A by communicating with one or more UEs performing method 300B, and vice versa.

The method of FIG. 3A may be performed by an MCPTT node connected to a group of UEs, and the the method of FIG. 3B may be performed by a UE connected to an MCPTT node. In this context, the MCPTT may be any type of wireless communication network node capable of implementing the indicated functionality, and the UE may be any type of radio node capable of implementing the indicated functionality.

Referring to FIG. 3A, the method 300A comprises generating a Multimedia Broadcast and Multicast Service (MBMS) Subchannel Control Key (MSCCK) (S305), sending first messages to the UEs in unicast, wherein the first messages contain the generated MSCCK (S310), generating MBMS subchannel control messages (S315), hashing and/or encrypting the MBMS subchannel control messages with the MSCCK (S320), and sending the MBMS subchannel control messages in multicast (e.g. broadcast) (S325).

The term "multicast", as used in this context, may refer to any transmission intended for multiple receiving parties, which of course includes broadcast transmissions. In this example, the MBMS subchannel control messages may be sent to the group of UEs, although they may not necessarily reach all UEs served by the MCPTT node, and the MBMS subchannel control messages may be received by other UEs located in an area where the MBMS bearer is available. In a typical scenario, the MBMS subchannel control message is sent towards a multicast address and port, using an MBMS bearer. The multicast address and port and the TMGI are generally announced to the UEs in the first messages sent to the UEs in unicast.

The term "hashing", as used in this context, may refer to a process that generates a MAC, or keyed hash, using the at least one MBMS subchannel control message and the MSCCK, and then and appends the resulting MAC value to the at least one MBMS subchannel control message.

Referring to FIG. 3B, the method 300B comprises receiving a first message from the MCPTT node in unicast, wherein the first message includes a Multimedia Broadcast and Multicast Service (MBMS) Subchannel Control Key (MSCCK) (S330), identifying the MSCCK from the message (S335), receiving an MBMS subchannel control message from the MCPTT node (S340), and hashing and/or decrypting the MBMS subchannel control message using the MSCCK (S345).

In certain related embodiments, an MCPTT node or UE may be configured to implement method 300A or 300B. For instance, in some embodiments, an MCPTT node configured to perform method 300A is equipped to be connected to a group of UEs to be served by the MCPTT node. The MCPTT may comprise key management and a Push-To-Talk (PTT) message generator (i.e., key management and PTT message generation functionalities, including any relevant hardware and/or software features). The key management is adapted to generate MSCCKs for hashing and/or encryption of MBMS subchannel control messages. The PTT message generator is adapted to generate and send first messages to said UEs containing said MSCCKs in unicast. The PTT message generator is further adapted to generate MBMS subchannel control messages, hash and/or encrypt them using said MSCCKs, and send them in multicast to the group of UEs.

In some other embodiments, a UE configured to perform method 300B is equipped to be connected to a serving MCPTT node. The UE is characterized by key management and a PTT message handler (i.e., key management and PTT message handling functionalities, including any relevant hardware and/or software features). The key management is adapted to extract the MSCCK from said first message. The PTT message handler is adapted to receive a first message in unicast from a serving MCPTT node, containing a MSCCK for hashing and/or decryption of MBMS subchannel control messages. The PTT message handler is further adapted to receive MBMS subchannel control messages in multicast and to hash and/or decrypt them using said MSCCK.

Figure 4A:
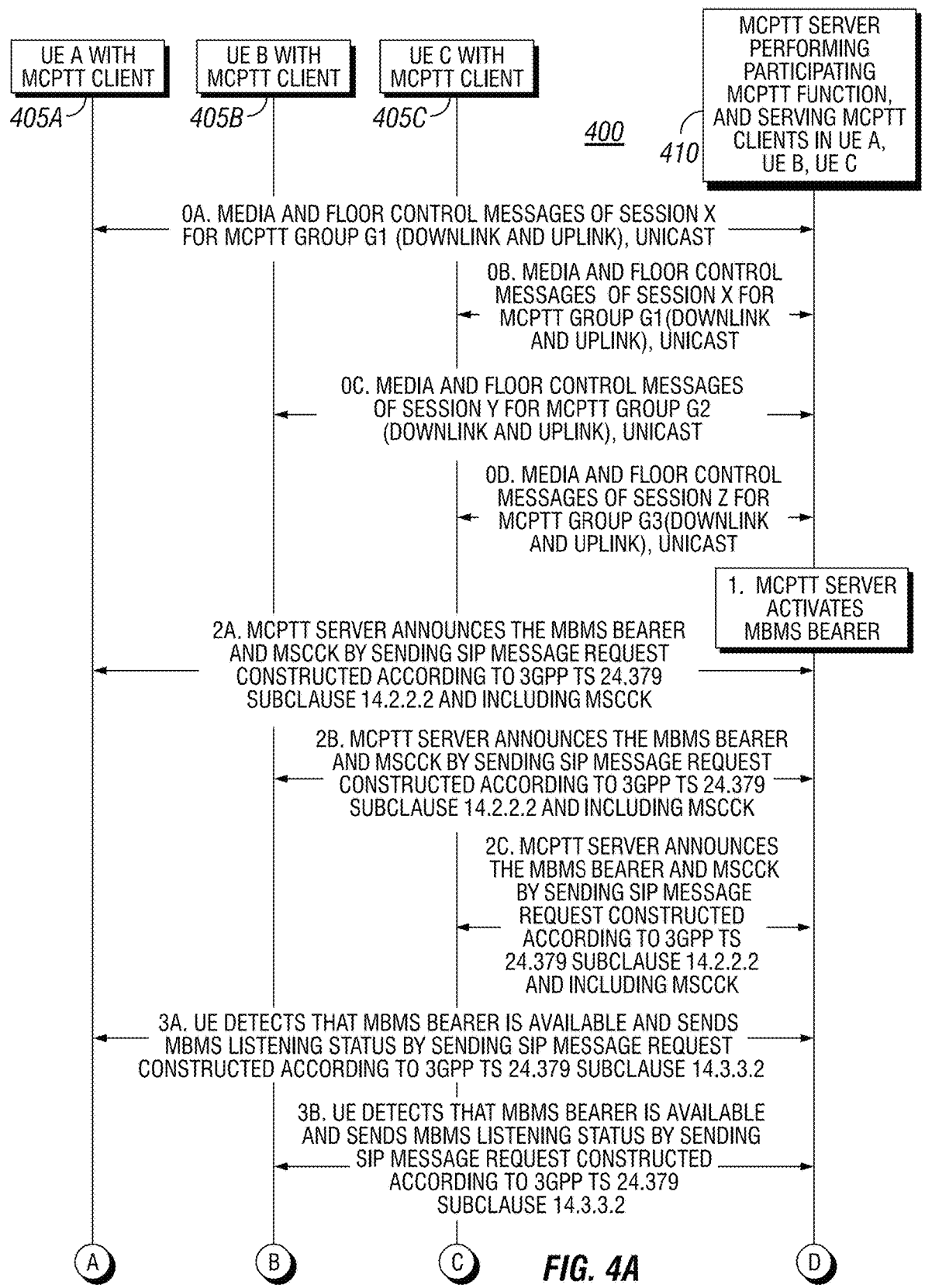
FIGS. 4A and 4B show a signal diagram illustrating a method of performing multicast distribution according to an embodiment of the disclosed subject matter.
Figure 4B:
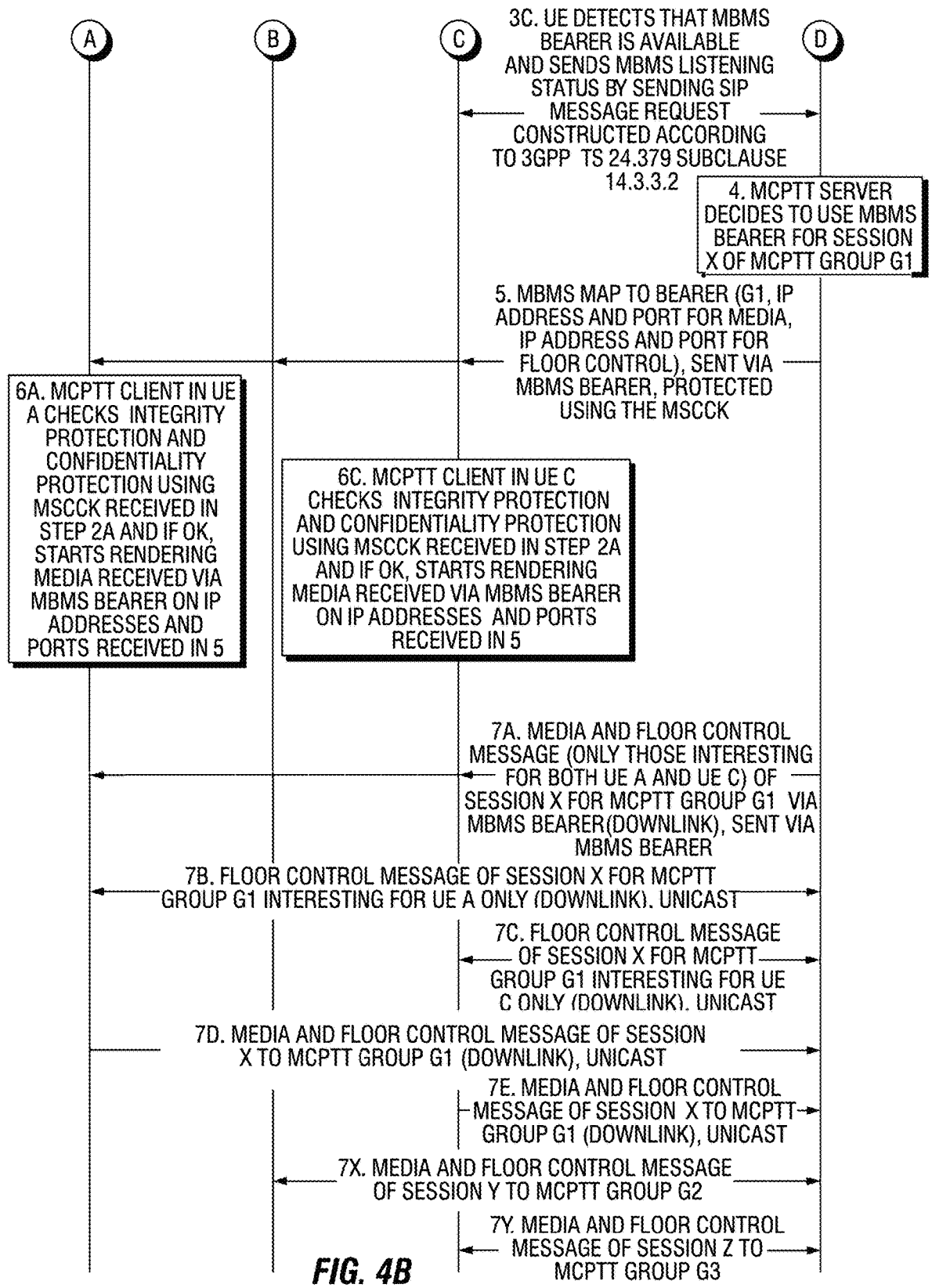

FIG. 4 is a signal diagram illustrating a method 400 of performing multicast distribution according to an embodiment of the disclosed subject matter. In the illustrated example, the method is performed in a system comprising a plurality of UEs 405A-C, each comprising an MCPTT client, and an MCPTT server 410, which may be implemented in a network node, for instance. The method of FIG. 4 is similar to the method of FIG. 2, with differences that will be apparent from the description that follows.

In the method of FIG. 4, when MCPTT server 410 activates an MBMS bearer, it generates an MSCCK. Thereafter, MCPTT server 410 informs a UE (e.g., any of UEs 405A-C) of the existence of the MBMS bearer, using unicast SIP signaling, ant it provides the MSCCK to the UE with the SIP signaling. In some instances, MCPTT 410 server can also provide a new MSCCK to the UE in a standalone SIP message.

MCPTT server 410 uses the MSCCK key(s) to hash (integrity protection) and/or encrypt (confidentiality protection) MBMS subchannel control messages.

When the UE receives an "Unmap Group To Bearer" message or a "Map Group To Bearer" message or other MBMS subchannel control messages (e.g. as specified in 3GPP TS 24.380 subclause 8.4) via an MBMS bearer, the UE checks the integrity and confidentiality protection of the message using the MSCCK received earlier using unicast SIP signaling.

An integrity check, in this context, includes checking if a sender identifier (ID) and message content are genuine by checking one or more hash values of the message with the MSCCK. A confidentiality check, in this context, includes decryption of a message with the MSCCK.

Figures 1, 2A:
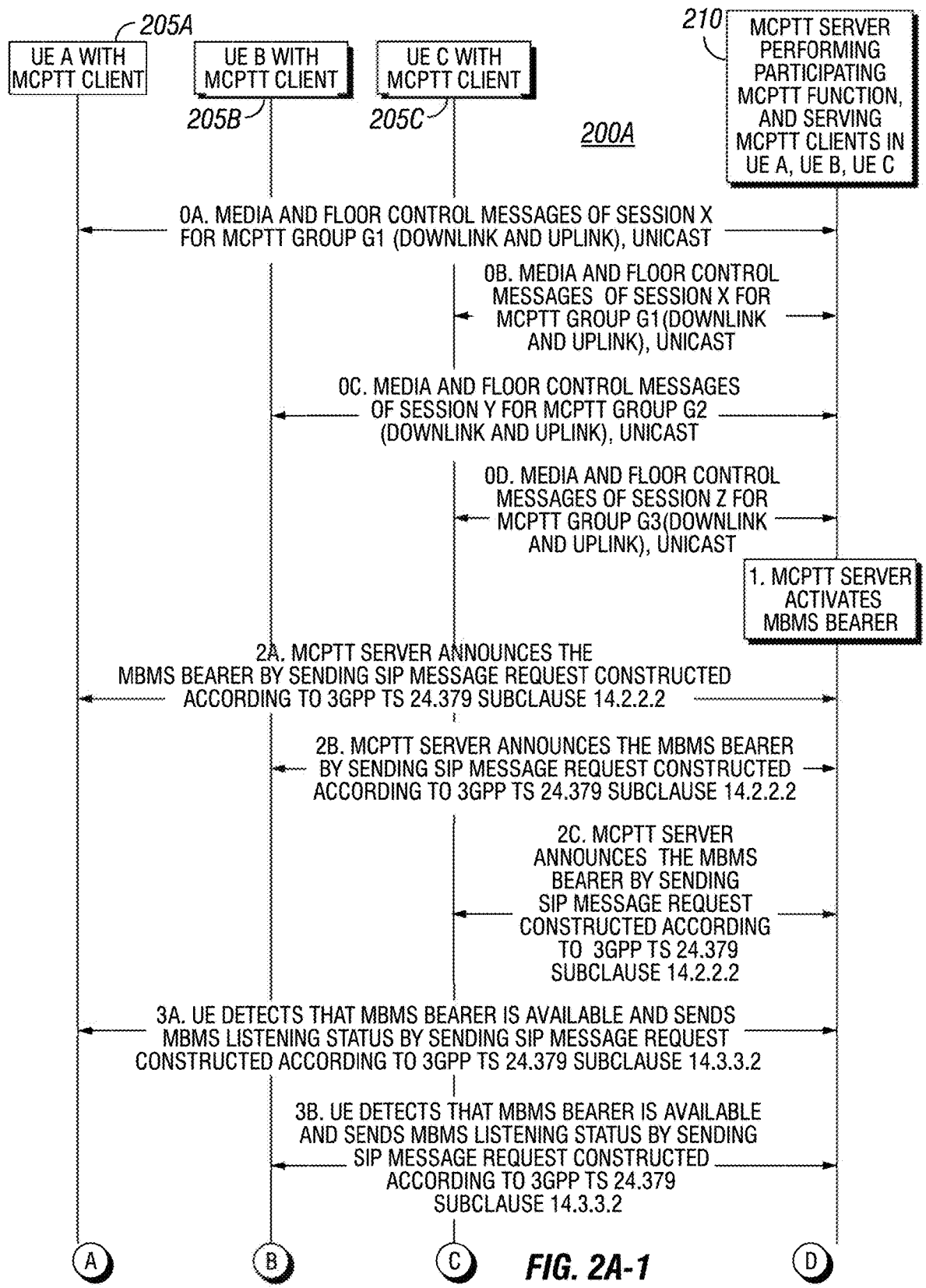
Figures 2, 2A:
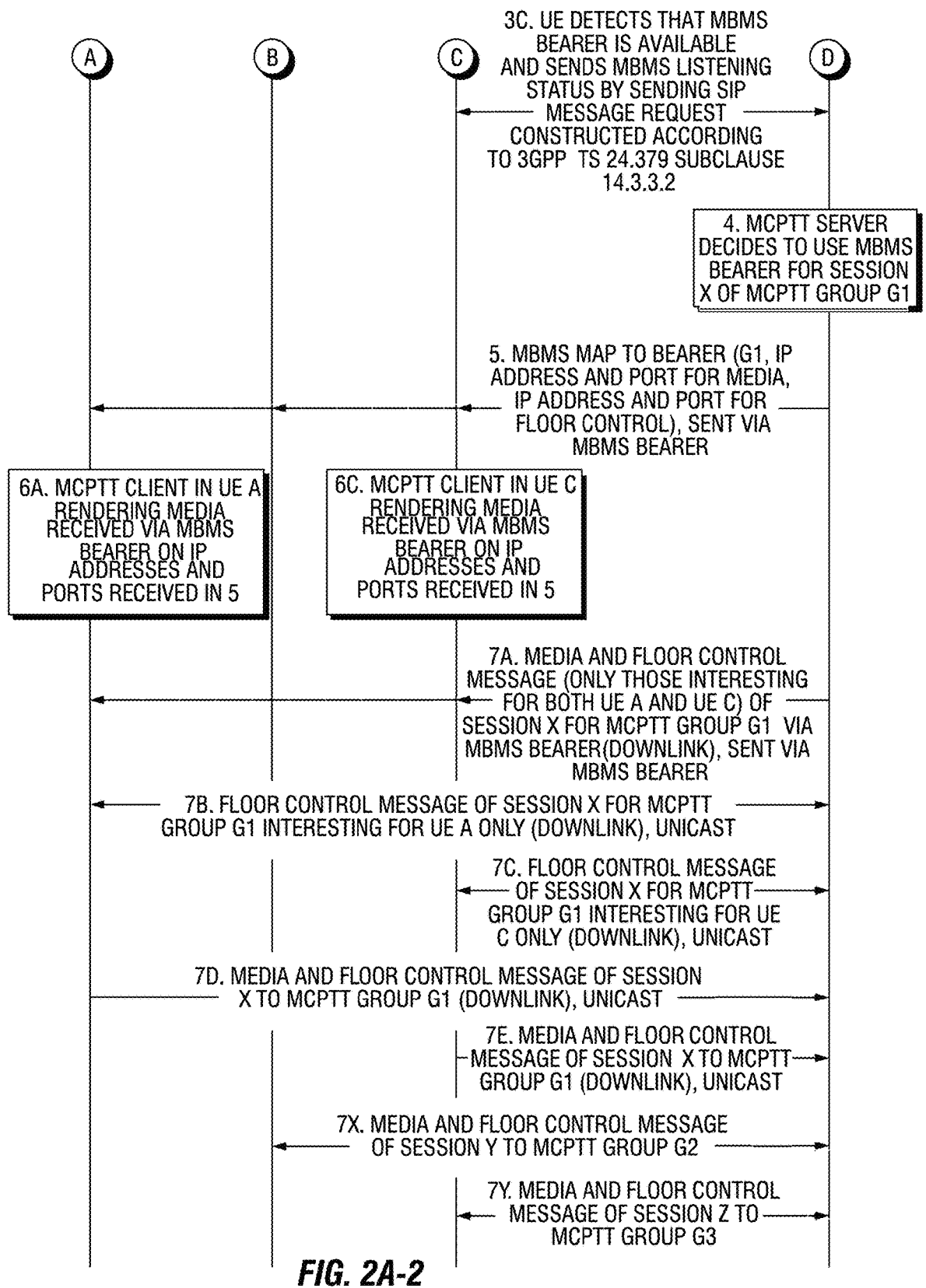
Figure 2B:
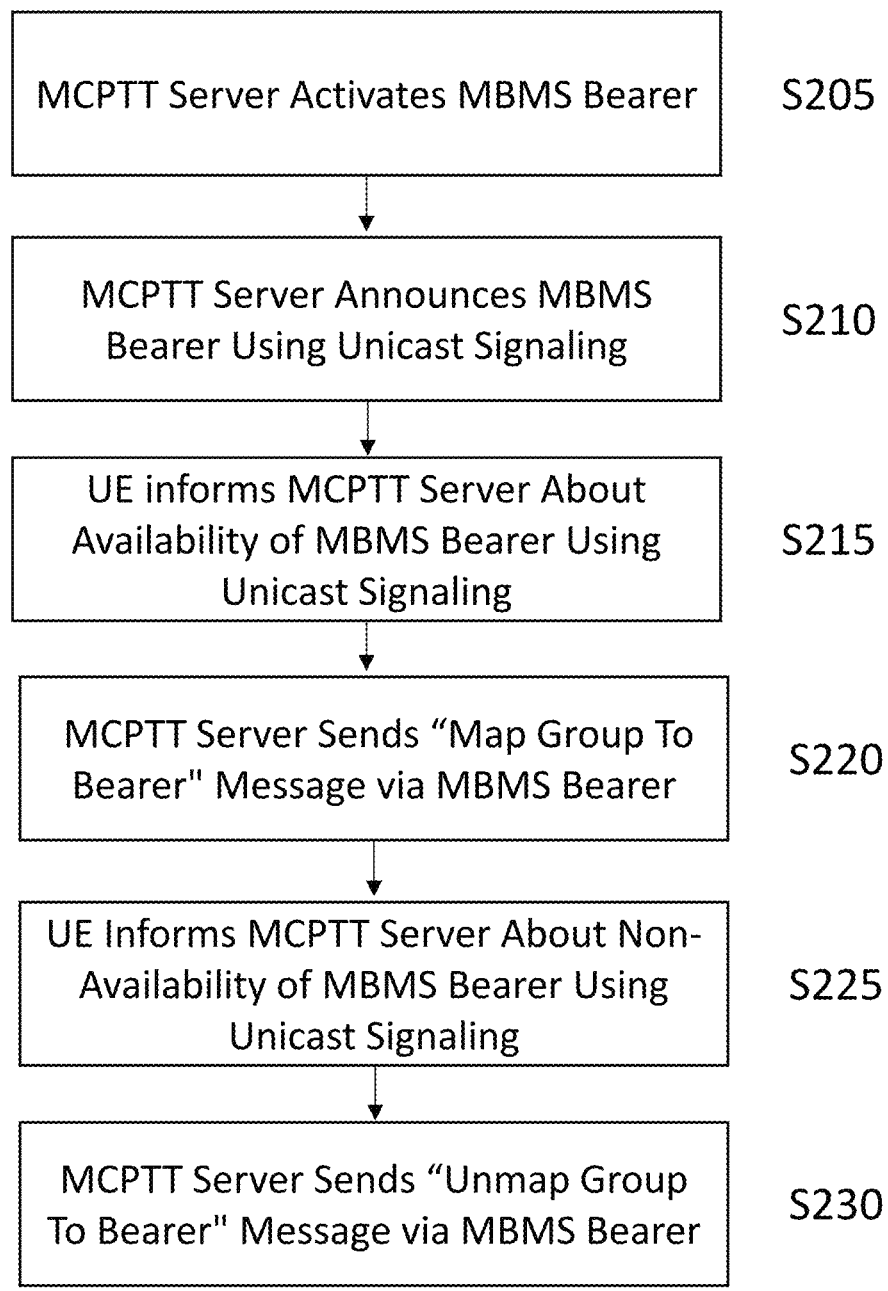
FIG. 2B is a flowchart illustrating a simplified version of the method illustrated in FIG. 2A.

Referring to FIG. 4, the following steps differ from the corresponding steps illustrated in FIG. 2, while other steps are like those illustrated in FIG. 2.

In steps 2a, 2b and 3c, the MCPTT server includes MSCCK in the SIP message request. In step 5, the MCPTT server applies protection (integrity protection, confidentiality protection or both) to the "Map Group To Bearer" message with the MSCCK as the key. In steps 6a and 6c, the MCPTT server applies protection (integrity protection, confidentiality protection or both) to the "Map Group To Bearer" message with the MSCCK as the key. UEs 405A-C check that the integrity of the message is genuine (if integrity protection is applied) and decrypt the message (if confidentiality protection is applied) with MSCCK as the key.

Figure 5A:
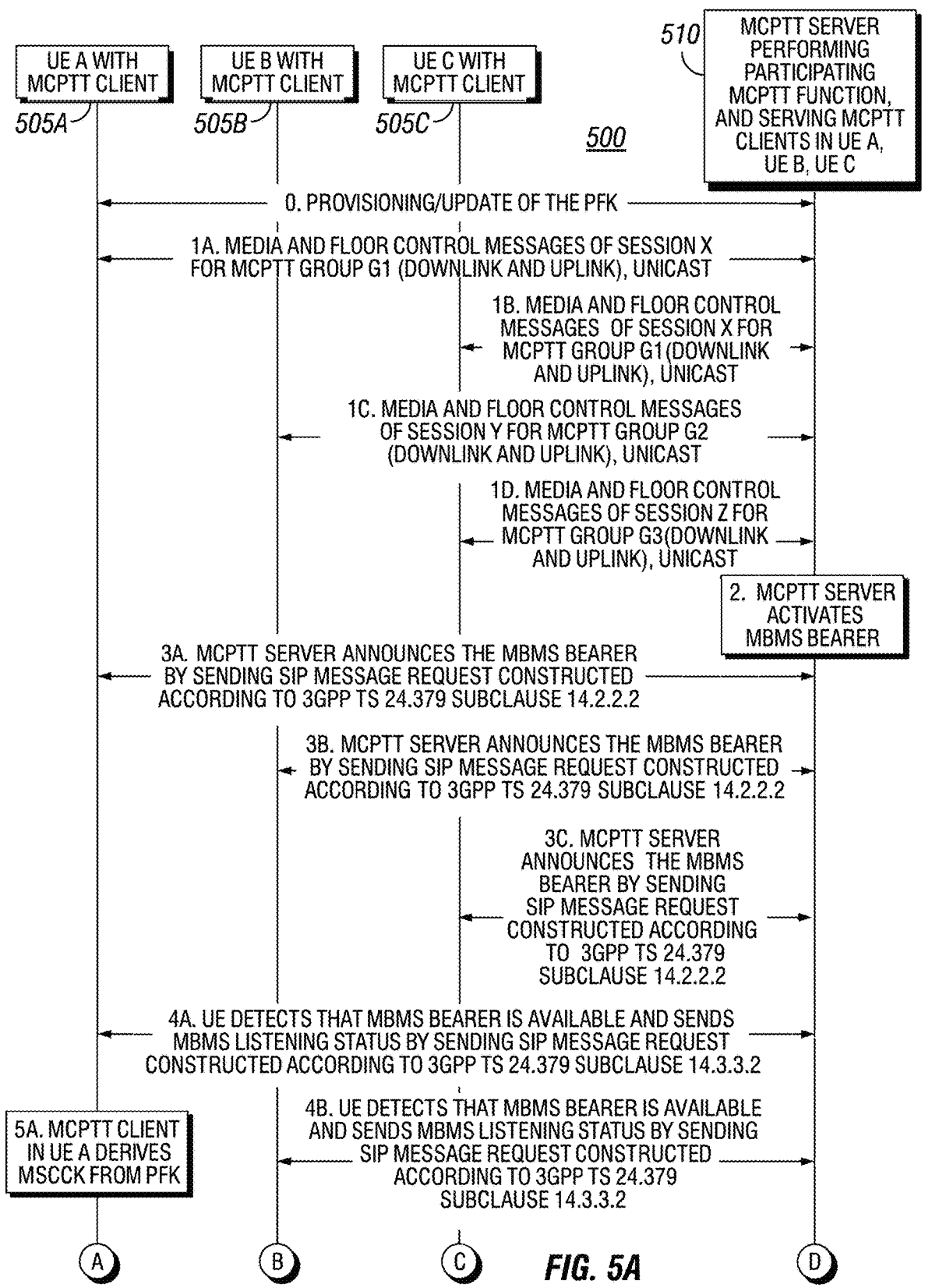
FIGS. 5A and 5B show a signal diagram illustrating a method of performing multicast distribution according to another embodiment of the disclosed subject matter.
Figure 5B:
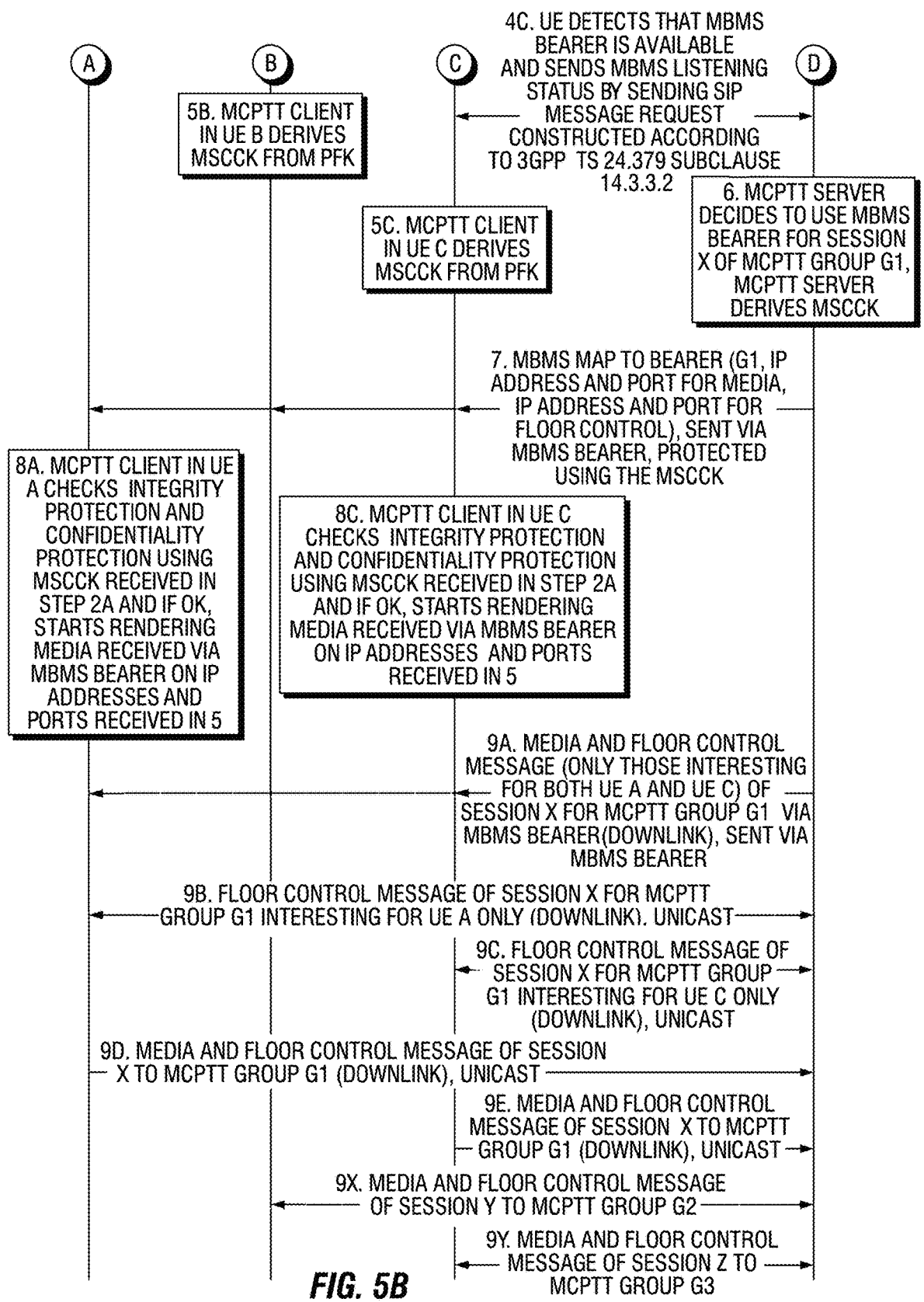

FIG. 5 is a signal diagram illustrating a method 500 of performing multicast distribution according to another embodiment of the disclosed subject matter. In the illustrated example, the method is performed in a system comprising a plurality of UEs 505A-C, each comprising an MCPTT client, and an MCPTT server 510, which may be implemented in a network node, for instance. The method of FIG. 5 is similar to the method of FIG. 2, with differences that will be apparent from the description that follows.

Referring to FIG. 5, the following steps differ from the corresponding steps illustrated in FIG. 2, while other steps are like those illustrated in FIG. 2.

In step 0, UEs that are served by MCPTT server 510 are configured with a participating function key (PFK). Subsequently, in step 6, in response to activation of an MBMS bearer, MCPTT server 510 derives an MBMS subchannel control key (MSCCK) from the PFK. This key could be made bearer-specific by e.g. using the Temporary Mobile Group Identity (TMGI) as an additional input to the key derivation function.

Similarly, in steps 5a-c, when UEs 505A-C are informed using unicast SIP signaling about existence of the MBMS bearer, the UEs also derive the MSCCK from the PFK. In case the key is bound to the TMGI, then the MCPTT client uses the TMGI information received in the notification message to derive the right MSCCK.

When the UE receives an "Unmap Group To Bearer" message or a "Map Group To Bearer" message or other MBMS subchannel control messages (e.g. as specified in 3GPP TS 24.380 subclause 8.4) via an MBMS bearer, e.g. as in step 7, the UE checks the integrity and confidentiality protection of the message using the MSCCK, e.g. as in step 8a or 8c.

In the method of FIG. 5, it is assumed that MCPTT UEs operating and the MCPTT server within an MCPTT domain are initially provisioned with PFK in step 0. Steps 5 can be executed anytime between steps 3 and 8. If the key is bound to the MBMS bearer TMGI, then the MCPTT UE use the TMGI received in step 3 for the derivation of the bearer-specific MSCCK.

Because currently specified MBMS subchannel control messages can only contain one MCPTT Group ID at a time, they are group-specific. Accordingly, an alternative method may be used to accommodate these MBMS subchannel control messages that are group-specific. The group-specific key may protect such messages to improve the integrity and/or security of multicast floor control traffic from the MCPTT server to the MCPTT UEs. When a message for an MCPTT Group containing a MCPTT Group ID (e.g., "x") is protected by the MKFC of that group "x", then only the members of group "x" would be able to decrypt and integrity check the message.

This alternative, compared to methods 400 and 500, has the potential benefit of preventing other MCPTT UEs, belonging to other groups but running a session on the same bearer, from decrypting control messages related to other groups. However, because the MKFC is also used in another session, care must be taken to make sure that there is a separation mechanism such as using the same index for both sessions.

Figure 6:
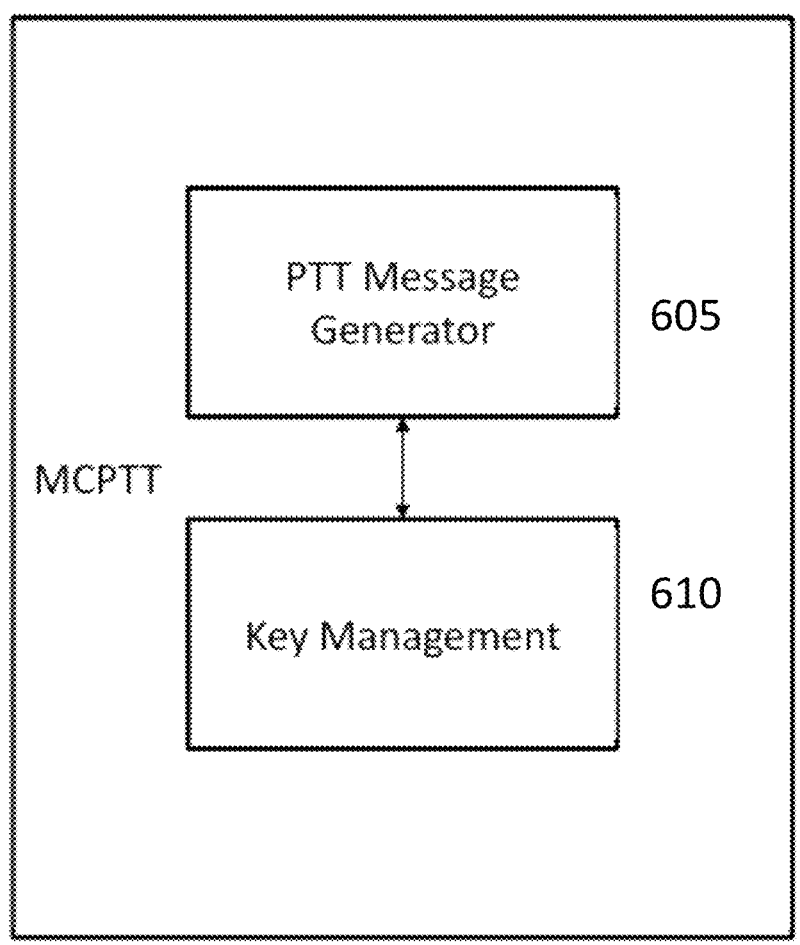
FIG. 6 is a block diagram illustrating an MCPTT node according to an embodiment of the disclosed subject matter.

FIG. 6 is a block diagram illustrating an MCPTT node 600 according to an embodiment of the disclosed subject matter. MCPTT node 600 may be used to implement e.g. methods such as those illustrated in FIG. 3A, 4 or 5. In some embodiments, for instance, MCPTT node 600 may comprise an MCPTT server such as MCPTT server 410 or 510.

Referring to FIG. 6, MCPTT node 600 comprises a PTT message generator module 605 and a key management module 610. The term "module", as used herein, refers to any suitable combination of hardware and/or software capable of implementing the indicated functionality.

PTT message generator module 605 requests an MSCCK to be generated by key management module 610. Thereafter, PTT message generator module 605 generates a key message containing the MSCCK and sends it to UEs using a transmission module (not shown). For further messages, PTT message generator module 610 requests an earlier generated MSCCK and uses the earlier generated MSCCK for hashing and/or encryption of the further message.

Figure 7:
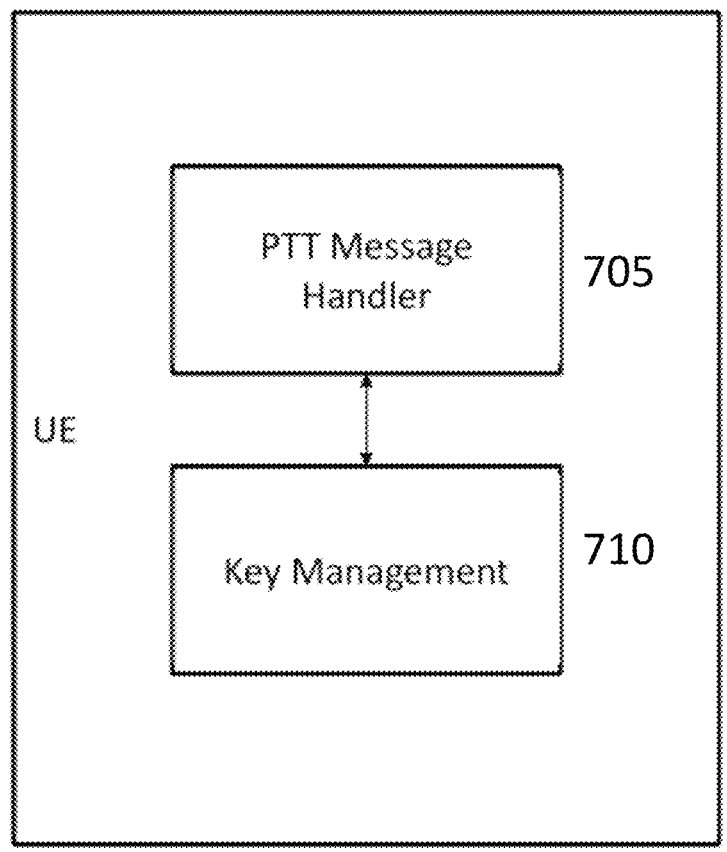
FIG. 7 is a block diagram illustrating a UE according to an embodiment of the disclosed subject matter.

FIG. 7 is a block diagram illustrating a UE 700 according to an embodiment of the disclosed subject matter. UE 700 may be used to implement e.g. methods such as those illustrated in FIG. 3B, 4 or 5. In some embodiments, for instance, UE 700 may take the form of any of UEs 405A-C or 505A-C.

Referring to FIG. 7, UE 700 comprises a PTT message handler module 705 and a key management module 710. UE 700 receives MCPTT related messages via an internal receiver module (not shown). Messages containing keys are transferred to key management module 710. Key management module 710 extracts MSCCK's from messages related to the PTT service and stores them. When PTT message handler 705 receives further messages and requires a key to check integrity and/or to decrypt, it requests a key from the key management module 710. Key management module 710 provides the key, and PTT message handler module 705 performs the integrity check and/or decrypt actions with the received MSCCK.

Figure 8:
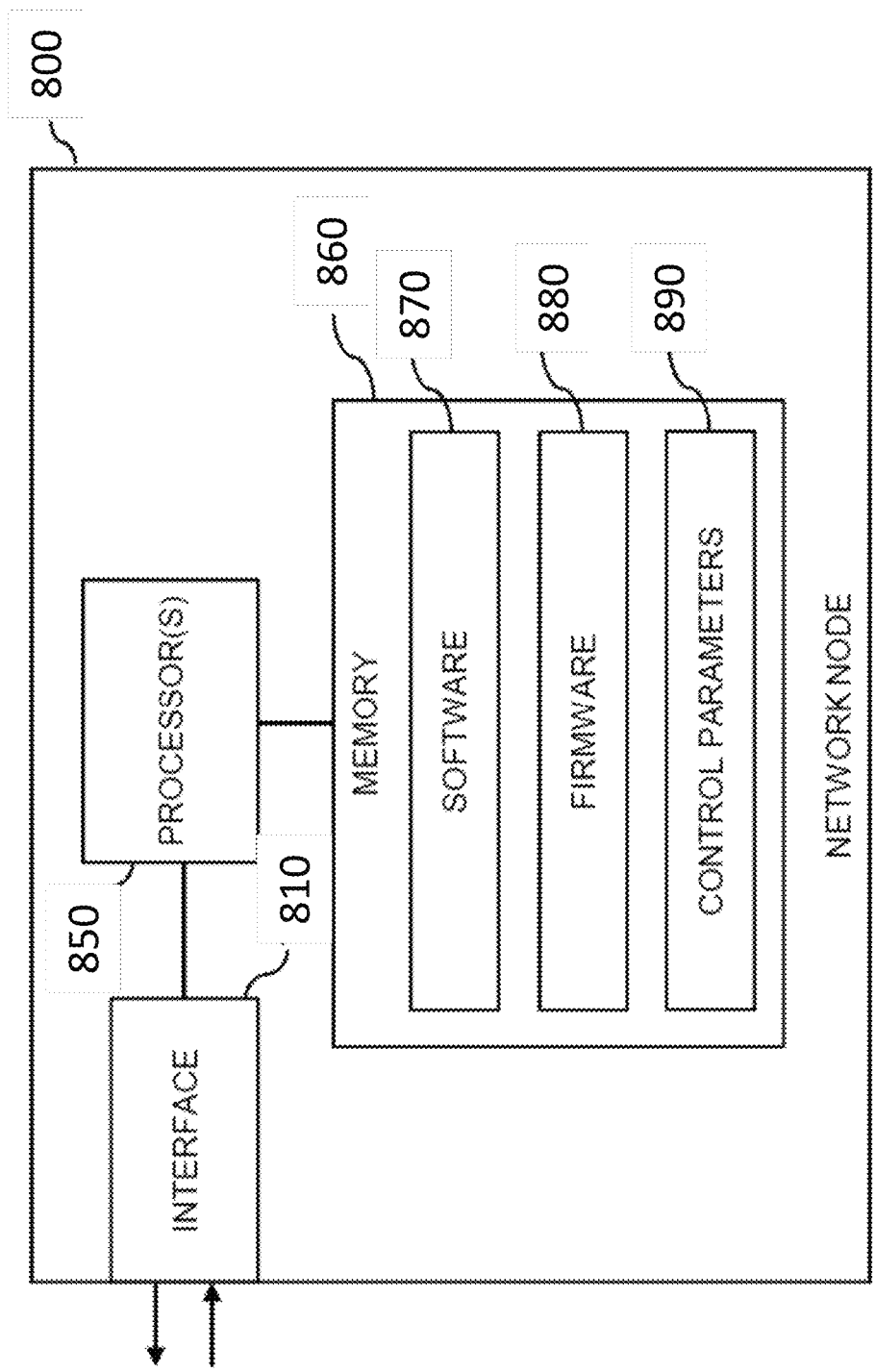
FIG. 8 is a block diagram illustrating a wireless communication network node according to an embodiment of the disclosed subject matter.

FIG. 8 illustrates a processor-based implementation of a wireless communication network node 800 which may be used for implementing the above described concepts. For example, the structures as illustrated in FIG. 8 may be used for implementing MCPTT node 600 and/or any of MCPTT servers 410 and 510.

Referring to FIG. 8, node 800 comprises an interface 810 for one or more radio devices, such as radio device 900 described below. Interface 810 may be a radio interface and be used for receiving UL transmissions from the radio device(s). Interface 810 may also be used for receiving and/or sending various information, such as for sending keys and encrypted messages.

Node 800 further comprises one or more processors 850 coupled to interface 810 and a memory 860 coupled to processor(s) 850. By way of example, control interface 810, processor(s) 850, and memory 860 could be coupled by one or more internal bus systems of node 800. Memory 860 may include a ROM, e.g., a flash ROM, a RAM, e.g., a DRAM or SRAM, a mass storage, e.g., a hard disk or solid state disk, or the like. As illustrated, memory 860 may include software 870, firmware 880, and/or control parameters 890. Memory 860 may include suitably configured program code to be executed by the processor(s) 850 so as to implement the above-described functionalities of a wireless communication network node, such as explained in connection with any of FIGS. 3-5.

The structures as illustrated in FIG. 8 are merely schematic, and node 800 may include further components which, for the sake of clarity, have not been illustrated, e.g., further interfaces or processors. Also, it is to be understood that memory 860 may include further program code for implementing known functionalities of a wireless communication network node, e.g., known functionalities of a base station or similar access node. In some embodiments, a computer program may be provided for implementing functionalities of node 800, e.g., in the form of a physical medium storing the program code and/or other data to be stored in memory 860 or by making the program code available for download or by streaming.

Figure 9:
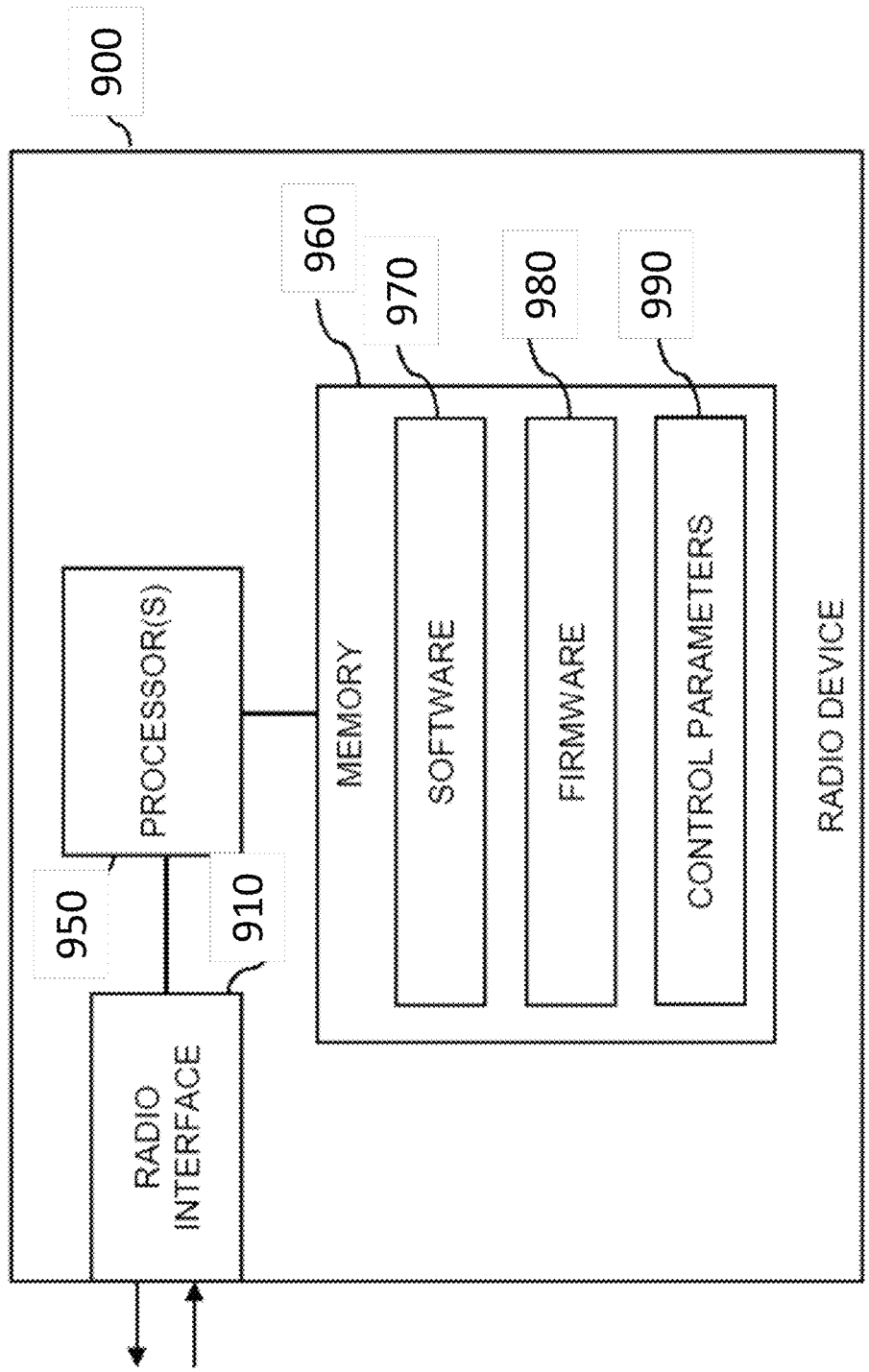
FIG. 9 is a block diagram illustrating a radio device according to an embodiment of the disclosed subject matter.

FIG. 9 illustrates a processor-based implementation of a radio device 900 which may be used for implementing the above described concepts. For example, the structures as illustrated in FIG. 9 may be used for implementing UE 700 and/or any of UEs 405A-C and 505A-C.

Referring to FIG. 9, radio device 900 comprises a radio interface 910 for performing radio transmissions, in particular UL transmissions to a wireless communication network. Radio interface 910 may also be used for receiving and/or sending various information, such as for receiving keys and encrypted messages.

Radio device 900 may further comprise one or more processors 950 coupled to radio interface 910 and a memory 960 coupled to the processor(s) 950. By way of example, radio interface 910, the processor(s) 950, and memory 960 could be coupled by one or more internal bus systems of radio device 900. Memory 960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, memory 960 may include software 970, firmware 980, and/or control parameters 990. Memory 960 may include suitably configured program code to be executed by the processor(s) 950 so as to implement the above-described functionalities of a radio device, such as those explained in connection with FIGS. 3-5.

The structures as illustrated in FIG. 9 are merely schematic, and radio device 900 may include further components which, for the sake of clarity, have not been illustrated, e.g., further interfaces or processors. Also, it is to be understood that memory 960 may include further program code for implementing known functionalities of a radio device, e.g., known functionalities of a UE or similar user end device. In some embodiments, also a computer program may be provided for implementing functionalities of radio device 900, e.g., in the form of a physical medium storing the program code and/or other data to be stored in memory 960 or by making the program code available for download or by streaming.

The following is a list of acronyms that may be used in this written description.

| | |
|---|---|
| APN | Access Point Name |
| ARP | Allocation and Retention Priority |
| AS | Application Server |
| BM-SC | Broadcast Multicast Service Centre |
| CHAP | Challenge-Handshake Authentication Protocol |
| CSC | Common Services Core |
| CSCF | Call Server Control Function |
| CSK | Call Service Key |
| D2D | Device to Device |
| DL | Downlink |
| DPF | Direct Provisioning Function |
| ECGI | E-UTRAN Cell Global Identifier |
| EPC | Evolved Packet Core |
| EPS | Evolved Packet System |
| E-UTRAN | Evolved Universal Terrestrial Radio Access Network |
| FQDN | Fully Qualified Domain Name |
| GBR | Guaranteed Bit Rate |
| GCS AS | Group Communication Service Application Server |
| GCSE_LTE | Group Communication Service Enabler over LTE |
| GMK | Group Management Key |

| | |
|---|---|
| GMK-ID | Group Master Key Identifier |
| GMS | Group Management Server |
| GRUU | Globally Routable User agent URI |
| GUK-ID | Group User Key Identifier |
| HLR | Home Location Register |
| HSS | Home Subscriber Server |
| HTTP | Hyper Text Transfer Protocol |
| ICE | Interactive Connectivity Establishment |
| I-CSCF | Interrogating CSCF |
| IdM | Identity Management |
| IdMS | Identity Management Server |
| IM CN | IP Multimedia Core Network |
| IMPI | IP Multimedia Private Identity |
| IMPU | IP Multimedia PUblic identity |
| IMS | IP Multimedia Subsystem |
| IP | Internet Protocol |
| IPEG | In-Progress Emergency Group |
| IPEPC | In-Progress Emergency Private Call |
| IPIG | In-Progress Imminent peril Group |
| KMS | Key Management Server |
| MBCP | Media Burst Control Protocol |
| MBMS | Multimedia Broadcast and Multicast Service |
| MBSFN Network | Multimedia Broadcast Multicast Service Single Frequency |
| MC | Mission-Critical |
| MC ID | Mission-Critical user identity |
| MCCP | Mission-Critical MBMS Subchannel Control Protocol |
| MCPTT | Mission-Critical Push-To-Talk |
| MCPTT AS | MCPTT Application Server |
| MCPTT group ID | MCPTT Group Identity |
| MCPTT User ID | MCPTT User Identity |
| MEA | MCPTT Emergency Alert |
| MEG | MCPTT Emergency Group |
| MEGC | MCPTT Emergency Group Call |
| MEPC | MCPTT Emergency Private Call |
| MEPP | MCPTT Emergency Private Priority |
| MES | MCPTT Emergency State |
| MIG | MCPTT Imminent Peril Group |
| MIGC | MCPTT Imminent Peril Group Call |
| MIME | Multipurpose Internet Mail Extensions |
| MKFC | Multicast Key Floor Control |
| MKI | Master Key Identifier |
| MONP | MCPTT Off-Network Protocol |
| MPEA | MCPTT Private Emergency Alert |
| MSCCK | MBMS Subchannel Control key |
| NAT | Network Address Translation |
| OIDC | OpenID Connect |
| PAP | Password Authentication Protocol |
| PCC | Policy and Charging Control |
| PCK | Private Call Key |
| PCK-ID | Private Call Key Identifier |
| PCRF | Policy and Charging Rules Function |
| P-CSCF | Proxy CSCF |
| PFK | Participating Function Key. |
| PLMN | Public Land Mobile Network |
| ProSe | Proximity-based Services |
| PSI | Public Service Identity |
| PSK | Pre-Shared Key |
| PTT | Push-To-Talk |
| QCI | QoS Class Identifier |
| QoS | Quality of Service |
| RAN | Radio Access Network |
| RF | Radio Frequency |
| RTCP | RTP Control Protocol |
| RTP | Real-time Transport Protocol |
| SAI | Service Area Identifier |
| S-CSCF | Serving CSCF |
| SDF | Service Data Flow |
| SDP | Session Description Protocol |
| SIP | Session Initiation Protocol |
| SRTCP | Secure RTCP |
| SRTP | Secure RTP |
| SRTP | Secure Real-Time Transport Protocol |
| SSL | Secure Sockets Layer |
| SSRC | Synchronization Source |
| TBCP | Talk Burst Control Protocol |
| TEK | Traffic-Encrypting Key |
| TGI | Temporary MCPTT Group Identity |
| TLS | Transport Layer Security |
| TMGI | Temporary Mobile Group Identity |
| TrK | KMS Transport Key |
| UDC | User Data Convergence |
| UDR | User Data Repository |
| UE | User Equipment |
| UM | Unacknowledged Mode |
| URI | Uniform Resource Identifier |
| USB | Universal Serial Bus |
| WLAN | Wireless Local Area Network |

While the disclosed subject matter has been presented above with reference to various embodiments, it will be understood that various changes in form and details may be made to the described embodiments without departing from the overall scope of the disclosed subject matter.

What is claimed:

1. A method of operating a UE comprising a Mission-Critical Push-To-Talk (MCPTT) client connected to a MCPTT node that serves the UE, comprising:
receiving one or more first messages from the MCPTT node in unicast when activating a MBMS bearer, wherein the one or more first messages comprises a Multimedia Broadcast and Multicast Service (MBMS) Subchannel Control Key (MSCCK);
identifying the MSCCK from the one or more first messages; and
receiving an MBMS subchannel control message from the MCPTT node in multicast; and
decrypting and/or integrity checking the MBMS subchannel control message using the MSCCK.

2. The method of claim 1, wherein decrypting and/or integrity checking the MBMS subchannel control message using the MSCCK comprises generating a message authentication code (MAC) value using the at least one MBMS subchannel control message and the MSCCK, and comparing the generated MAC value to a MAC value appended to the at least one MBMS subchannel control message.

3. The method of claim 1, wherein decrypting and/or integrity checking the MBMS subchannel control message using the MSCCK comprises decrypting the MBMS subchannel control message using the MSCCK.

4. The method of claim 1, wherein the at least one MBMS subchannel control message comprises a Map Group To Bearer message.

5. The method of claim 1, wherein the at least one MBMS subchannel control message comprises an Unmap Group To Bearer message.

6. A UE comprising a Mission-Critical Push-To-Talk (MCPTT) client connected to a MCPTT node that serves the UE, the UE comprising one or more processors and memory that includes program code that is executable by the one or more processors for causing the UE to perform the following functions:
receiving one or more first messages from the MCPTT node in unicast when activating a MBMS bearer, wherein the one or more first messages comprises a Multimedia Broadcast and Multicast Service (MBMS) Subchannel Control Key (MSCCK);
identifying the MSCCK from the one or more first messages; and
receiving an MBMS subchannel control message from the MCPTT node in multicast; and
decrypting and/or integrity checking the MBMS subchannel control message using the MSCCK.

7. The UE of claim 6, wherein decrypting and/or integrity checking the MBMS subchannel control message using the MSCCK comprises generating a message authentication code (MAC) value using the at least one MBMS subchannel control message and the MSCCK, and comparing the generated MAC value to a MAC value appended to the at least one MBMS subchannel control message.

8. The UE of claim 6, wherein decrypting and/or integrity checking the MBMS subchannel control message using the MSCCK comprises decrypting the MBMS subchannel control message using the MSCCK.

9. The UE of claim 6, wherein the at least one MBMS subchannel control message comprises a Map Group To Bearer message.

10. The UE of claim 6, wherein the at least one MBMS subchannel control message comprises an Unmap Group To Bearer message.

* * * * *

UNITED STATES PATENT AND TRADEMARK OFFICE
CERTIFICATE OF CORRECTION

PATENT NO. : 10,841,753 B2  
APPLICATION NO. : 16/439125  
DATED : November 17, 2020  
INVENTOR(S) : Sedlacek et al.

Page 1 of 1

It is certified that error appears in the above-identified patent and that said Letters Patent is hereby corrected as shown below:

On the Title Page

Item (72), under "Inventors", in Column 1, Line 1, delete "Hovorcovice (CZ);" and insert -- Hovorčovice (CZ); --, therefor.

In Column 1, below "Related U.S. Application Data", delete Item "(60)" and insert Item -- (63) --, therefor.

In the Specification

In Column 1, Line 9, delete "is continuation" and insert -- is a continuation --, therefor.

In Column 1, Line 10, delete "2018," and
insert -- 2018, now granted as U.S. Pat. No. 10,356,566 on Jul. 16, 2019, --, therefor.

In Column 6, Line 17, delete "and the the method" and insert -- and the method --, therefor.

In Column 7, Line 37, delete "signaling, ant" and insert -- signaling, and --, therefor.

In Column 7, Line 59, delete "steps 2a, 2b and 3c," and insert -- steps 2a, 2b and 2c, --, therefor.

In Column 11, Line 21, delete "Network" and insert the same at Line 21, after "Frequency" as a continuation point.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*